United States Patent
Choi et al.

(10) Patent No.: US 7,257,123 B2
(45) Date of Patent: Aug. 14, 2007

(54) GATEWAY HAVING BYPASSING APPARATUS

(75) Inventors: In-Ho Choi, Suwon (KR); Young-Woo Kwon, Seoul (KR); Jun-Goo Lee, Anyang (KR); Yong-Seog Pahn, Kyungki-Do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1054 days.

(21) Appl. No.: 10/265,792

(22) Filed: Oct. 8, 2002

(65) Prior Publication Data

US 2003/0219025 A1 Nov. 27, 2003

(30) Foreign Application Priority Data

May 27, 2002 (KR) .............................. 2002-29336

(51) Int. Cl.
*H04L 12/56* (2006.01)
(52) U.S. Cl. .................................................. 370/401
(58) Field of Classification Search ................ 370/401, 370/355, 384, 385, 400, 216–219
See application file for complete search history.

(56) References Cited

U.S. PATENT DOCUMENTS

| | | | | |
|---|---|---|---|---|
| 5,577,023 A | * | 11/1996 | Marum et al. | ............... 370/225 |
| 5,825,850 A | * | 10/1998 | Bren et al. | ............... 379/27.02 |
| 5,862,145 A | | 1/1999 | Grossman et al. | .......... 714/704 |
| 5,958,063 A | * | 9/1999 | Croslin et al. | ................. 714/4 |
| 6,137,792 A | * | 10/2000 | Jonas et al. | ................. 370/354 |
| 6,327,242 B1 | * | 12/2001 | Amicangioli et al. | ....... 370/216 |
| 6,328,480 B1 | | 12/2001 | Strike | .......................... 385/75 |
| 6,363,065 B1 | * | 3/2002 | Thornton et al. | ........... 370/352 |
| 2002/0004843 A1 | * | 1/2002 | Andersson et al. | ......... 709/238 |

* cited by examiner

*Primary Examiner*—Wing Chan
*Assistant Examiner*—Lawrence J Burrowes
(74) *Attorney, Agent, or Firm*—Staas & Halsey LLP

(57) ABSTRACT

A gateway enables mutual data communication between two or more networks by connecting the networks and forming a bypass path between the two networks to enable data communication therebetween when the gateway does not support a normal data communication mode. The gateway can form at least one physical communication path between the networks through the gateway even if the gateway cannot support a normal communication mode and/or power is interrupted to the gateway. Further, in spite of abnormal conditions, such as abnormal power supply to the gateway, if the bypass path is not formed, a user can compulsorily form the bypass path, thus improving reliability of a network system.

15 Claims, 6 Drawing Sheets

GATEWAY HAVING BYPASSING APPARATUS

CROSS-REFERENCE TO RELATED APPLICATIONS

This application claims the benefit of Korean Application No. 2002-29336 filed May 27, 2002, in the Korean Intellectual Property Office, the disclosure of which is incorporated herein by reference.

BACKGROUND OF THE INVENTION

1. Field of the Invention

The present invention relates generally to data communication equipment, and more particularly, to a gateway, which can enable mutual data transmission between a plurality of networks by connecting the networks.

2. Description of the Related Art

Among equipment required in data communication, a gateway functions as a gate of a network, and enables transmission of data by connecting different kinds of networks. Functions of such a gateway are described with reference to FIG. 1. FIG. 1 is a view showing the construction of two networks connected to each other through a conventional gateway.

As shown in FIG. 1, a first local area network (LAN) 112 and a second LAN 114, which are independent networks, are connected to each other through a gateway 102. The first and second LANs 112 and 114 transmit data using Ethernet based transmission control protocol/Internet protocol (TCP/IP) communication protocols. The gateway 102 is used for the purpose of data transmission between the two networks. Referring to FIG. 1, the first LAN 112 is connected to a server 104 and a host computer 106, and the second LAN 114 is connected to a main frame 108 and a single channel access device 110. The gateway 102 connects the first and second LANs 112 and 114 physically separated from each other, thus enabling data transmission between devices connected to respective networks.

The single channel access device 110 carries out its given duties by communicating with the server 104 or the host computer 106 connected to the first LAN 112 through the gateway 102. In this case, since only one communication channel is formed, the single channel access device 110 cannot simultaneously communicate with two computers, etc. Typically, the server 104 or the host computer 106 monitors operating states of the single channel access device 110, and collects data or transmits required control instructions from/to the single channel access device 110.

However, if networks are connected through the conventional gateway, the gateway 102 cannot support a normal communication mode when the gateway 102 is turned off due to logical errors, a power supply is interrupted due to power failure, a presence of unacceptable noise components/level on the supplied power, etc. Therefore, in case of gateway failure/malfunction, communication between networks cannot be carried out.

For example, the single channel access device 110 cannot communicate with the server 104 or the host computer 106, so the single channel access device 110 cannot assure normal operations. In such a case, if the single channel access device 110 cannot be normally controlled by the server 104 or the host computer 106 to perform normal operations, other entire systems related to the single channel access device 110 may be paralyzed, or may cause errors in the other systems, thus resulting in serious problems. For example, if the single channel access device 110 is a device constituting a production line of products, and the gateway 102 fails/malfunctions as described above, errors may occur in the product production process, thus greatly increasing defective production of products. Further, if the single channel access device 110 is an electric power generation device or a device of a chemical plant, etc., and failures/malfunctions as described above are generated, the failures/malfunctions may cause fatal accidents, thereby possibly causing/increasing risks of significant loss of lives.

SUMMARY OF THE INVENTION

An object of the present invention is to provide a gateway having a bypassing apparatus, which can improve reliability of the gateway by forming at least one physical communication path between networks through the gateway even if the gateway cannot support a normal communication mode.

Additional objects and advantages of the invention will be set forth in part in the description which follows and, in part, will be obvious from the description, or may be learned by practice of the invention.

The present invention may be achieved by providing a gateway enabling mutual data communication between two or more networks by connecting the networks, and the gateway forms a bypass path between the networks to enable data communication therebetween when the gateway does not/cannot support a normal data communication mode between the networks. Typically, the gateway cannot support normal data communication because of power supply problems and/or other software/hardware/logic failures.

BRIEF DESCRIPTION OF THE DRAWINGS

The above and other objects, features and other advantages of the present invention will be more clearly understood from the following detailed description of the preferred embodiments taken in conjunction with the accompanying drawings, in which.

DETAILED DESCRIPTION OF THE PREFERRED EMBODIMENTS

Figure 1:
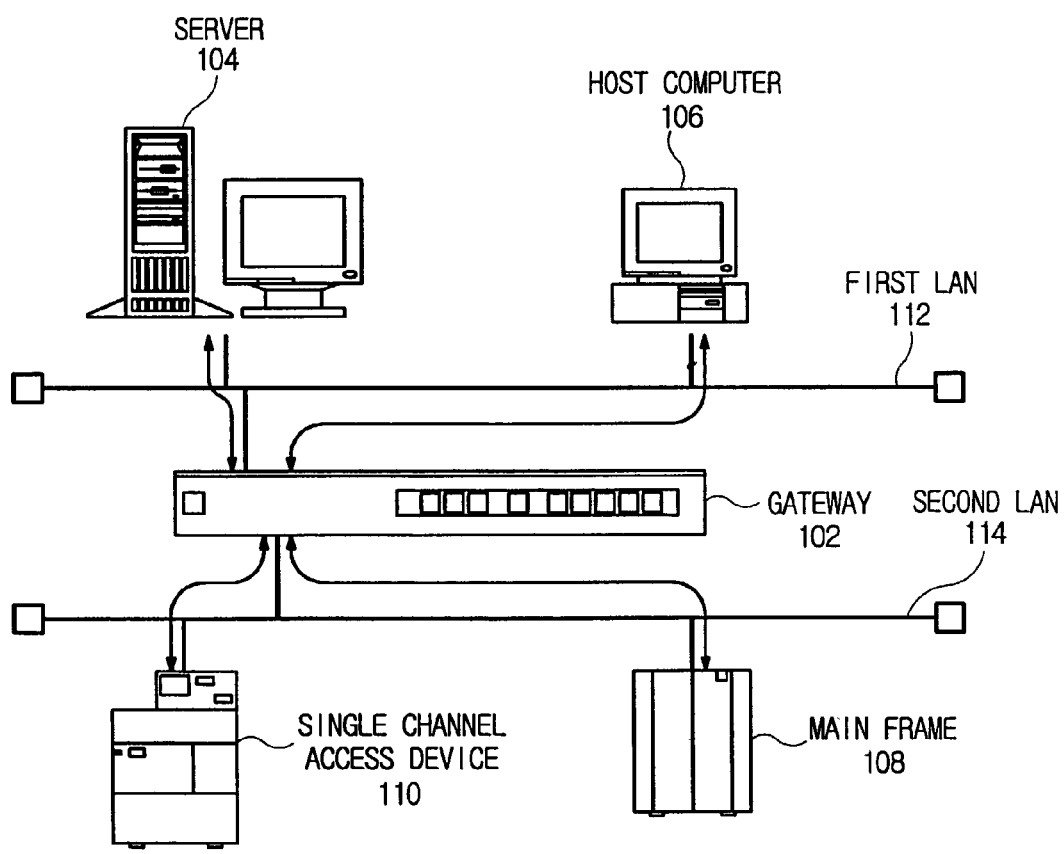
FIG. 1 is a view showing construction of two networks connected through a conventional gateway.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 2:
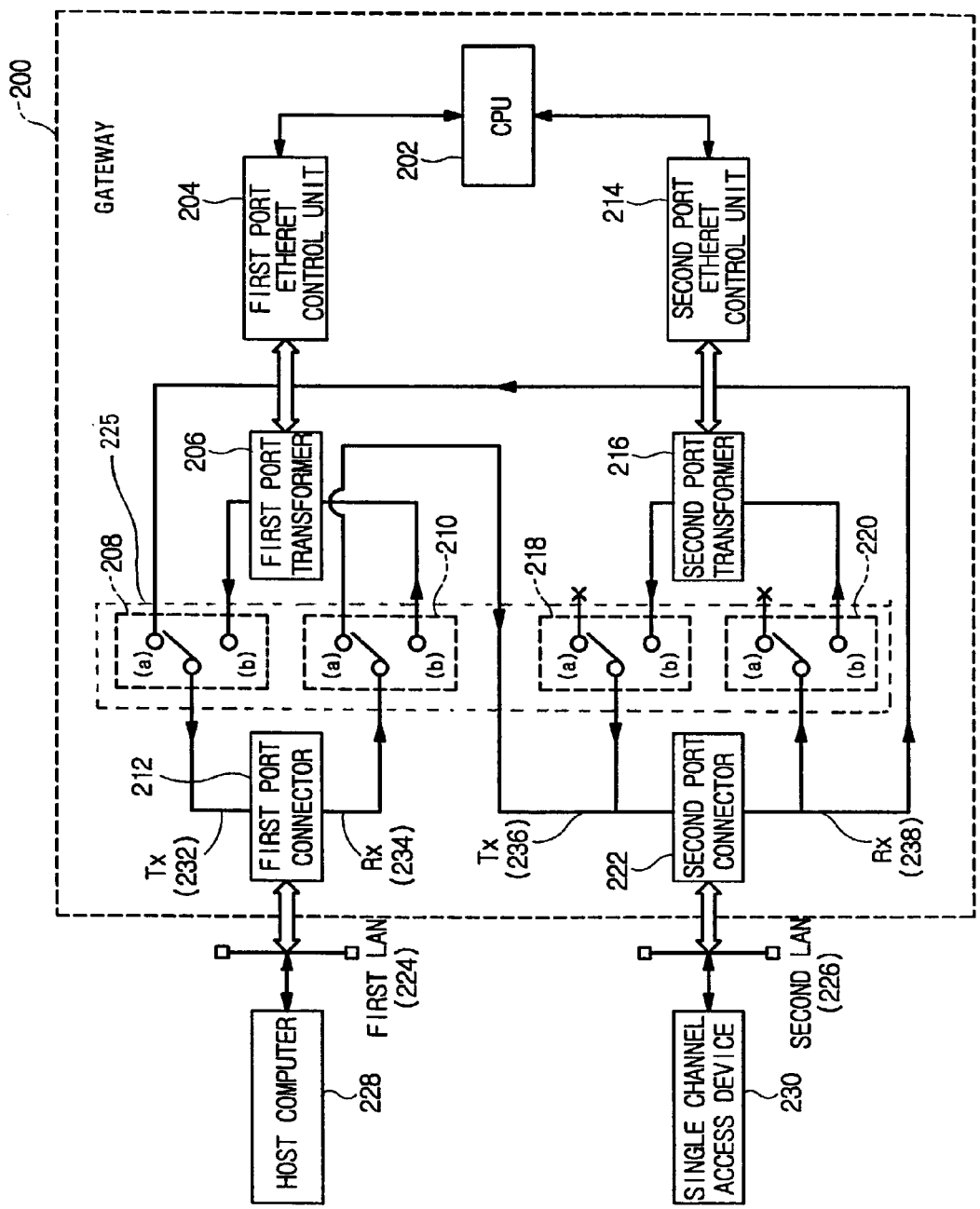
FIG. 2 is a block diagram of a gateway having a bypassing apparatus according to an embodiment of present invention.

FIG. 2 is a block diagram of a gateway having a bypassing apparatus according to an embodiment of the present invention. As shown in FIG. 2, a first LAN 224 and a second LAN 226 are connected to each other through a gateway 200 of the present invention. The first LAN 224 is connected to a host computer 228, and the second LAN 226 is connected to a single channel access device 230. As an example, the host computer 228 controls the single channel access device via the first LAN 224, the gateway 200 and the second LAN 226, using Ethernet based transmission control protocol/Internet protocol (TCP/IP) communication protocols.

The first LAN 224 is connected to a first port connector 212 of the gateway 200. A transmission line (Tx) 232 of the first port connector 212 can be connected to a first port transformer 206 or to a reception line (Rx) 238 of a second port connector 222, through a switch 208, which can be a relay. A reception line 234 of the first port connector 212 can be connected to the first port transformer 206 or connected to a transmission line 236 of the second port connector 222, through a switch 210, which can be a relay. Further, the transmission line 236 of the second port connector 222 is connected to a second port transformer 216 through a switch 218, which can be a relay. Further, the reception line 238 of the second port connector 222 is connected to the second port transformer 216 through a switch 220, which can be a relay. The second port connector 222 is connected to the second LAN 226. Typically, the switches 208, 210, 218 and 220 are relays.

The gateway 200 can connect a wide range of communication network types, including a public data network (PDN), a public switched telephone network (PSTN), etc., as well as LANs. Since typically a signal level on a communication line from the networks is higher than processing/data signal lines within the gateway 200, the first and second transformers 206 and 216 serve to decrease the signal level to a level which can be processed by first and second port Ethernet controllers 204 and 214, and a central processing unit 202. Further, the transformers 206 and 216 can serve, for example, to eliminate noise components of signals passing through the gateway 200. The switches 208, 210, 218 and 220 form a bypasser 225. A bypass controller (not shown) can control the bypasser 225 (i.e., the four switches 208, 210, 218 and 220) to provide bypass communication paths between the first LAN and the second LAN. The bypass paths are created in the event that the port transformers 206, 216, port Ethernet controllers 204, 214, and/or the CPU 202 cannot operate normally, for example, because of unacceptable power supply noise components, logic errors, failures, etc. The communication bypass paths can be, for example, physical communication paths, requiring no power.

Figure 3:
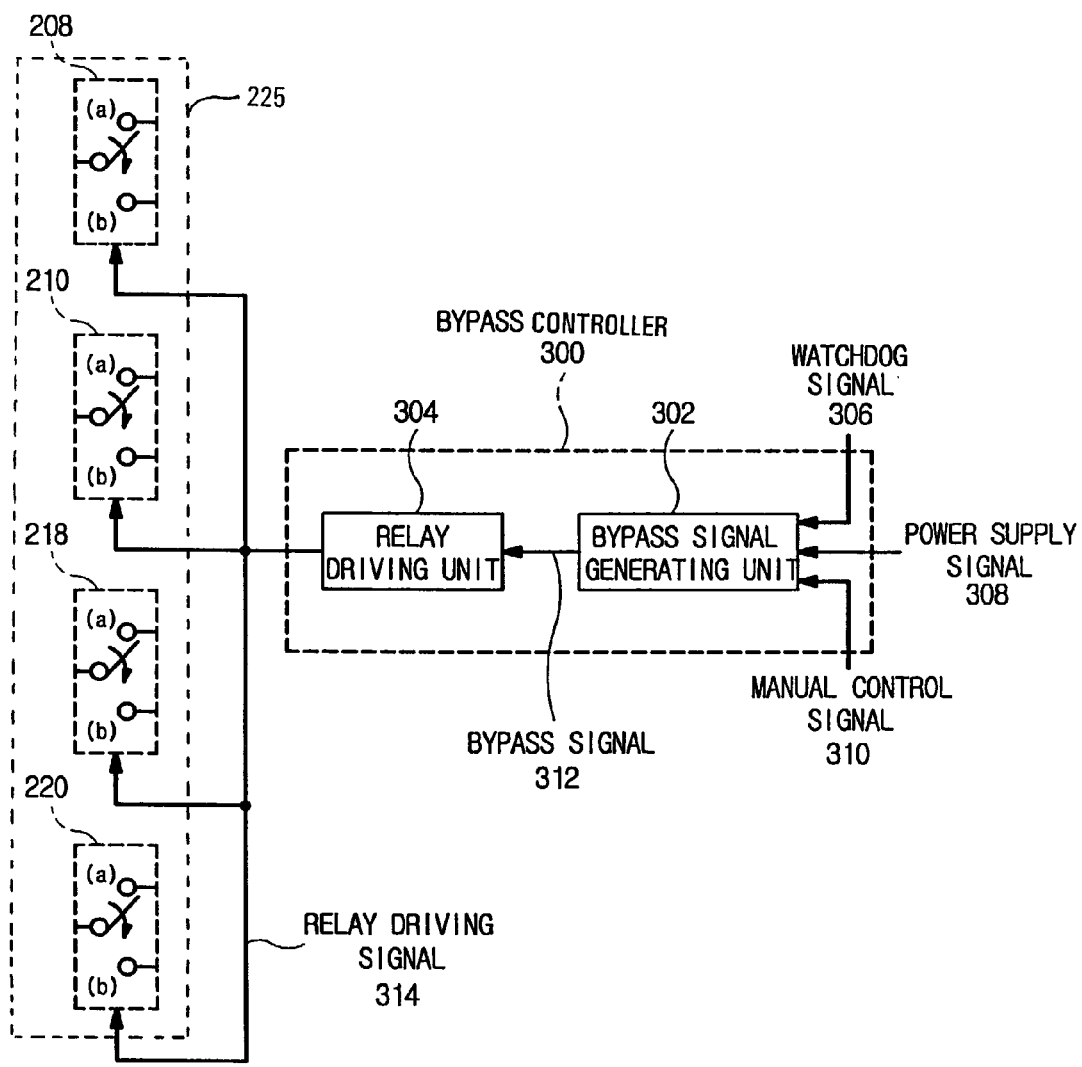
FIG. 3 is a block diagram of a bypass controller controlling the bypassing apparatus shown in FIG. 2.

FIG. 3 is a block diagram of a bypass controller 300 controlling the bypassing apparatus 225 shown in FIG. 2, according to an embodiment of the present invention. As shown in FIG. 3, the bypass controller 300 comprises a bypass signal generator 302 and a relay driver 304. The bypass signal generator 302 typically generates a bypass signal 312 in response to/based upon a watchdog signal 306, a power supply signal 308 and a manual control signal 310. The bypass signal 312 operates the relay driver 304 to generate a relay driving signal 314. The relay driving signal 314 drives the bypasser 225 (i.e., the four relays 208, 210, 218 and 220) to form a bypass path of the present invention.

Among the typical signals input to the bypass signal generator 302, the watchdog signal 306 is generated when the gateway 200 is in an abnormal state (i.e., operates abnormally). The power supply signal 308 is generated when power supplied to the gateway 200 is interrupted. The manual control signal 310 is generated according to a user's manipulation (i.e., user input) when the user desires to compulsorily/manually form a bypass path of the present invention in the gateway 200. The bypass signal generator 302 generates the bypass signal 312 when at least one of the three signals 306, 308 and 310 is generated and/or provided to the bypass signal generator 302. The bypass controller 300 and the bypasser 225, embodying bypass processes of the invention to provide bypass communication paths responsive to gateway processing/operation conditions, such as component malfunctions, can be software and/or hardware, using known techniques.

Figure 4A:
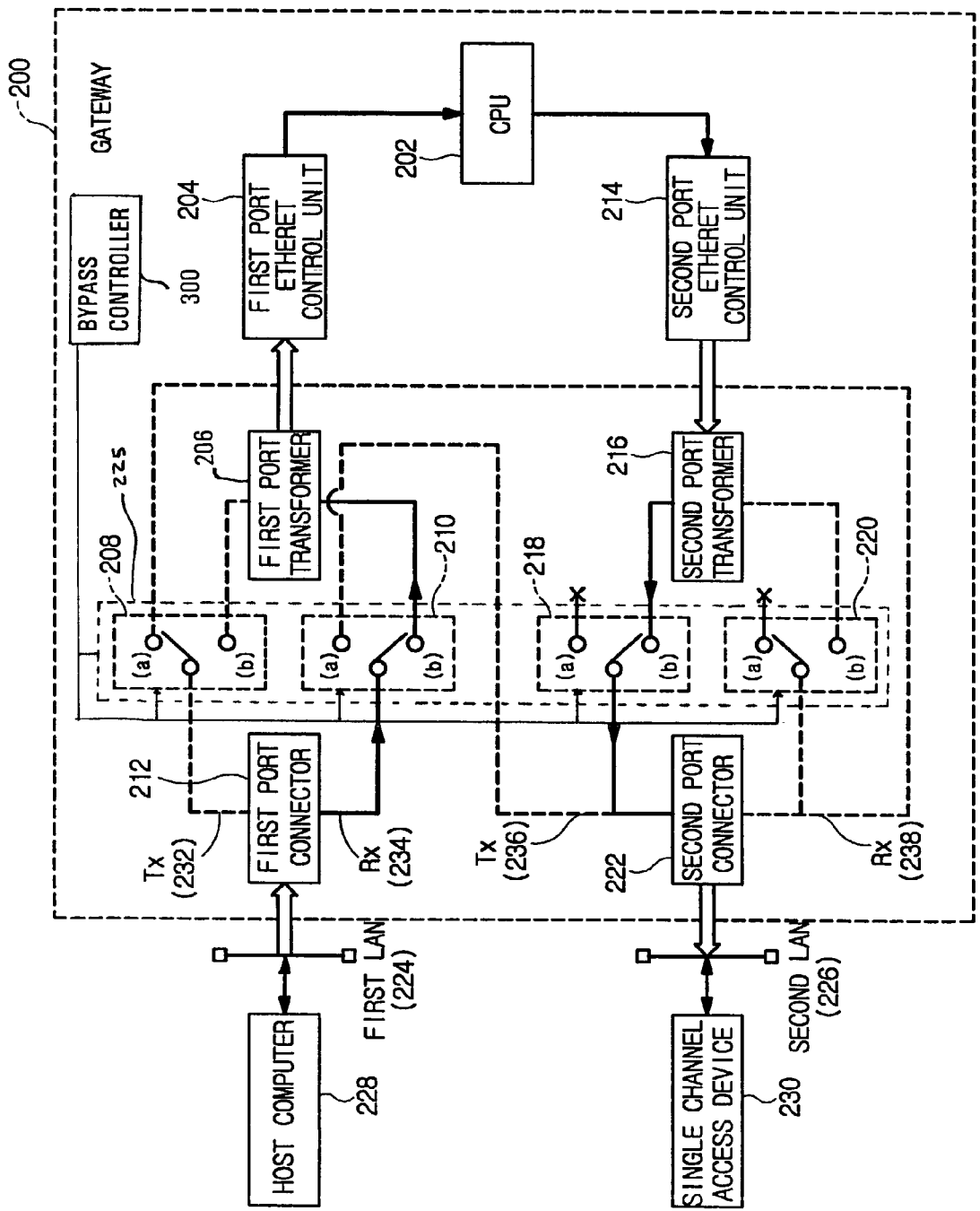
FIG. 4A is a view showing a data communication path extended from a first LAN to a second LAN when the gateway shown in FIG. 2 supports a normal data communication mode.

FIG. 4A is a view showing a data communication path extended from the first LAN 224 to the second LAN 226 when the gateway 200 can support a normal data communication mode. Referring to FIG. 4A, a path indicated with solid lines is a data communication path extended from the first LAN 224 to the second LAN 226. As shown in FIG. 4A, ordinary contact points of the four relays 208, 210, 218 and 220 are contact points (a) and (b). When the gateway 200 desires to form the data communication path extended from the first LAN 224 to the second LAN 226, the two relays 208 and 220 maintain their current states in which they form connections through the contact points (a). On the contrary, the relays 210 and 218 switch their contact points to contact points (b). Therefore, a communication path extended from the first LAN 224 to the second LAN 226 is formed while passing through the reception line 234 of the first port connector 212, the relay 210, the first port transformer 206, the first port Ethernet control unit 204, the central processing unit 202, the second port Ethernet control unit 214, the second port transformer 216, the relay 218 and the second port connector 222.

Figure 4B:
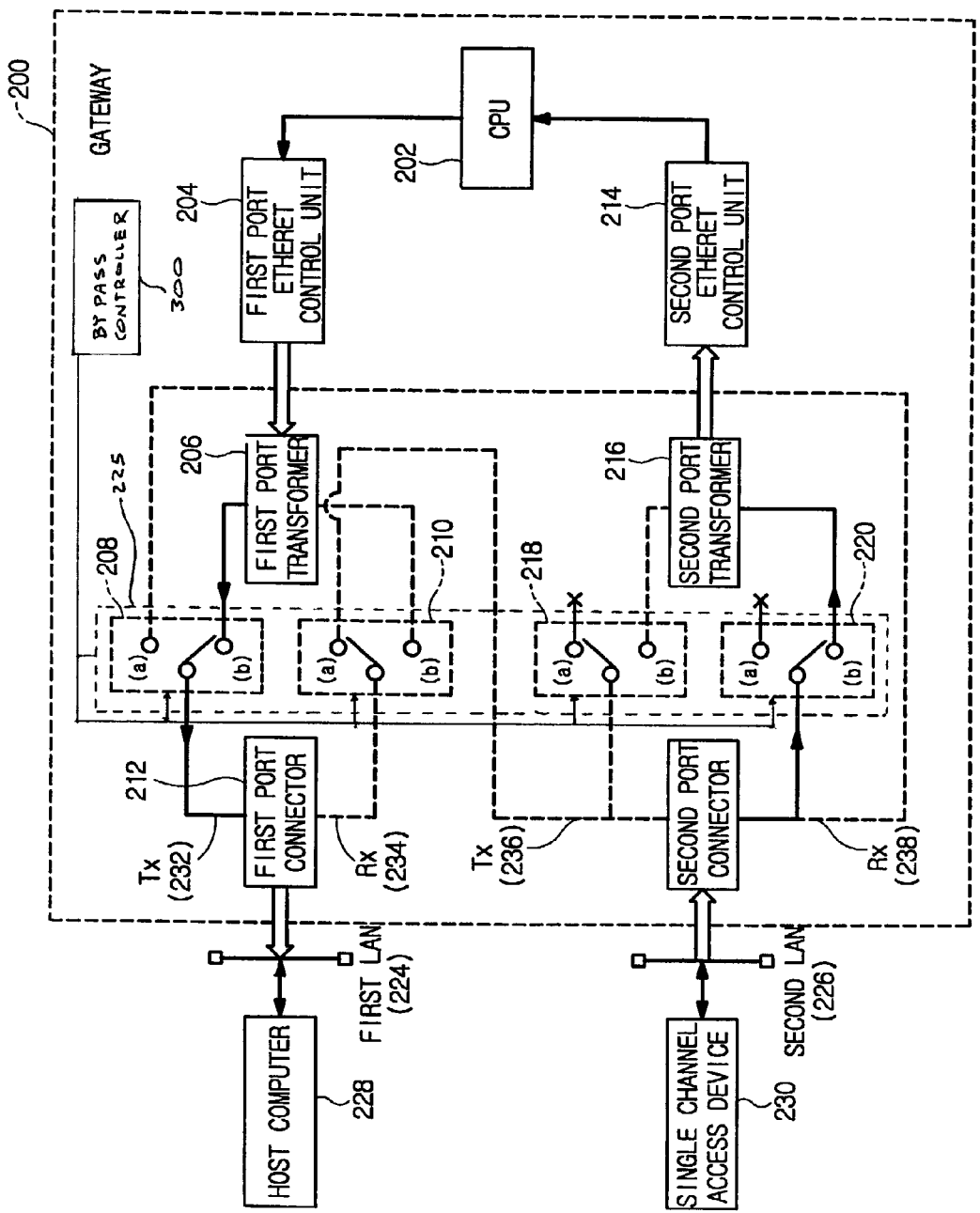
FIG. 4B is a view showing a data communication path extended from the second LAN to the first LAN when the gateway shown in FIG. 2 supports a normal data communication mode.

FIG. 4B is a view showing a data communication path extended from the second LAN 226 to the first LAN 224 when the gateway 200 can support a normal data communication mode. Referring to FIG. 4B, a path indicated with solid lines is a data communication path extended from the second LAN 226 to the first LAN 224. As shown in FIG. 4B, ordinary contact points of the four relays 208, 210, 218 and 220 are the contact points (a) and (b). When the gateway 200 desires to form the data communication path extended from the second LAN 226 to the first LAN 224, the two relays 210 and 218 maintain their current states in which they form connections through the contact points (a). On the contrary, the relays 208 and 220 switch their contact points to contact points (b). Therefore, a communication path extended from the second LAN 226 to the first LAN 224 is formed while passing through the reception line 238 of the second port connector 222, the relay 220, the second port transformer 216, the second port Ethernet control unit 214, the central processing unit 202, the first port Ethernet control unit 204, the first port transformer 206, the relay 208 and the first port connector 212.

Figure 5:
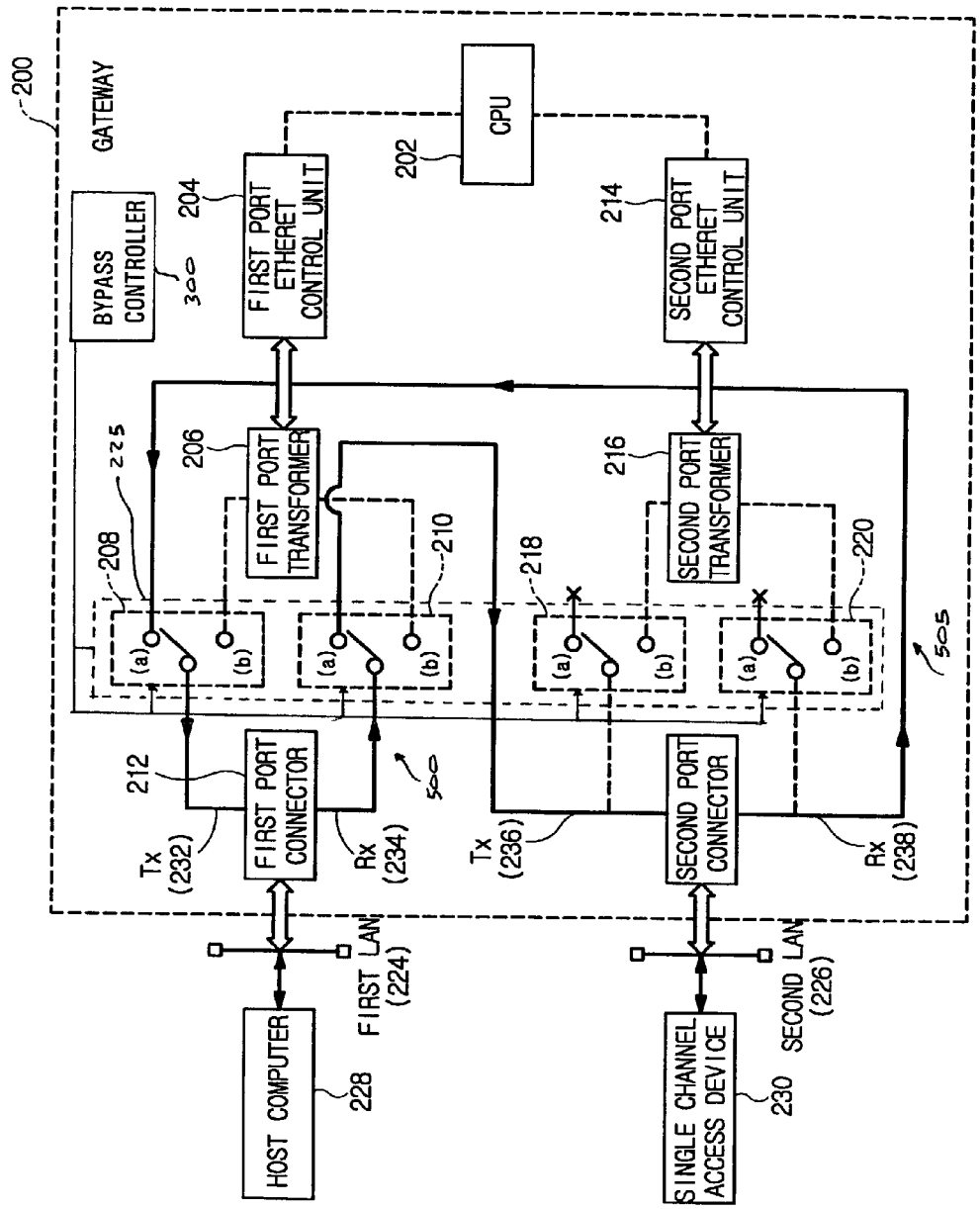
FIG. 5 is a view showing a bypass communication path formed within the gateway shown in FIG. 2 when the gateway cannot support a normal data communication mode.

FIG. 5 is a view showing a bypass communication path formed within the gateway 200 when the gateway 200 cannot support a normal data communication mode. Referring to FIG. 5, paths 500 and 505 indicated with solid lines are the bypass communication paths formed according to the present invention. As shown in FIG. 5, all of the four relays 208, 210, 218 and 220 form connections through the contact points (a), thus forming the bypass paths 500 and 505 of the present invention. The bypass path 500 extended from the first LAN 224 to the second LAN 226 passes through the reception line 234 of the first port connector 212, the relay 210 and the transmission line 236 of the second port connector 222. The bypass path 505 extended from the second LAN 226 to the first LAN 224 passes through the reception line 238 of the second port connector 222, the relay 208 and the transmission line 232 of the first port connector 212. Typically, the bypass paths 500, 505 provide a single channel communication path, in which devices can be connected to other devices one at a time via the first and second LANs through the bypass path.

In an aspect of the invention, the bypass paths 500 and 505 do not pass through the transformers 206 and 216, the Ethernet control units 204 and 214 and the central processing unit 202. Therefore, even if the gateway 200 cannot support a normal data communication mode, a direct physical data communication path can be formed between the first and second port connectors 212 and 222. That is, in case of processing abnormalities in the gateway 200, data communication can be achieved between the host computer 228 and the single channel access device 230, respectively connected to the first LAN 224 and the second LAN 226. For example, when normal power is not supplied to the gateway 200, the supply of power is interrupted, the user desires to intentionally form a bypass path, or the gateway 200 is incapable of operating under normal conditions, at least one physical data communication path can be formed between the first and second LANs 224 and 226. Therefore, the single channel access device 230 can perform normal operations under the control of the host computer 228.

As described above, the present invention provides a gateway having a bypassing apparatus and a controller thereof can accommodate abnormal conditions/states of the gateway. The bypassing apparatus of the invention can automatically form a bypass path, such as (but not limited to) a physical (direct or indirect) bypass path, within the gateway upon abnormal conditions, for example, when abnormal power (e.g., typically power with unacceptable noise components) is supplied to the gateway, when the supply of power to the gateway is interrupted, or when the user desires to form the bypass path. In case of a physical bypass path, which does not require power, at least one channel can be formed between two devices connected to each other through the gateway even though a problem occurs in power supply to the gateway. Therefore, even if the gateway cannot perform normal operations, unacceptable noise flows in the power supply to the gateway, or the supply of power is fundamentally interrupted due to power failure, etc., at least one data communication path can be formed between two devices connected through LANs, thus improving the reliability of a network system. Further, in spite of abnormal power supply to the gateway, if the bypass path is not formed, the user can compulsorily (manually) form the bypass path, thus further improving the reliability of a network system.

Although the embodiment of the invention is described using two LANs and one gateway therebetween, the present invention is not limited to such configuration and two or more LANs and gateways of the invention connecting the LANs can be provided. Further, although the embodiment of the invention is described using a physical bypass communication paths, the present invention is not limited to such configuration and other bypass paths can be provided, such as powered bypass paths, or powered bypass paths using backup transformers, network controllers and/or CPUs triggered by bypass controllers of the invention upon abnormal conditions. Therefore, a gateway of the invention enables mutual data communication between two or more networks by connecting the networks and forming a bypass path between the two networks to enable data communication therebetween when the gateway does not support a normal data communication mode, thus improving reliability of the network system. In particular, the gateway of the invention via a bypasser and a bypass controller controlling the bypasser can form at least one physical communication path between the networks through/within the gateway even if the gateway cannot support a normal communication mode and/or power is interrupted to the gateway. Further, in spite of abnormal conditions, such as abnormal power supply to the gateway, if the bypass path is not formed, a user can compulsorily form the bypass path.

Although the preferred embodiments of the present invention have been disclosed for illustrative purposes, those skilled in the art will appreciate that various modifications, additions and substitutions are possible, without departing from the scope and spirit of the invention, the scope of which is defined in the claims and their equivalents.

What is claimed is:

1. A gateway enabling mutual data communication between two or more networks by connecting the networks, comprising:
   a bypass path between the networks to enable data communication therebetween when the gateway does not support a normal data communication mode;
   at least one switch allowing formation of one of a data communication path and the bypass path, the switch being a relay; and
   a bypass controller generating a relay driving signal driving a relay.

2. The gateway according to claim 1, wherein the bypass path is a single channel communication path.

3. The gateway according to claim 1, wherein the bypass path is a physical communication path formed within the gateway.

4. The gateway according to claim 1, wherein the bypass controller comprises:
   a bypass signal generator generating a bypass signal by monitoring power supply to the gateway; and
   a relay driver generating the relay driving signal in response to the bypass signal.

5. The gateway according to claim 4, wherein:
   the bypass signal generator receives a watchdog signal generated when the power supply is abnormal, a power supply signal generated when the power supply is interrupted, and a manual control signal enabling the bypass path to be formed according to a user selection, and
   the bypass signal generator generates the bypass signal when at least one of the watchdog signal, the power supply signal and the manual control signal is received.

6. A gateway enabling mutual data communication between two or more networks by connecting the networks, comprising:
   a central processing unit processing data signals received through communication lines;
   a first port connector connected to a first local area network (LAN) and provided with transmission and reception lines;
   a second port connector connected to a second LAN and provided with transmission and reception lines;
   first and second transformers mutually converting voltage levels of a signal of the communication lines and a signal of the central processing unit by considering a difference between the two signal levels;
   a first network control unit connected between the central processing unit and the first transformer controlling data communication;

a second network control unit connected between the central processing unit and the second transformer controlling data communication; and a bypassing apparatus allowing a data communication path sequentially passing through the first port connector, the first network control unit, the central processing unit, the second network control unit and the second port connector to be formed in a normal data communication mode which supports multiple channel access between the first and second LANs, and allowing a bypass path directly connecting the first port connector with the second port connector to be formed when the normal data communication mode is not supported.

7. The gateway according to claim 6, wherein the bypassing apparatus comprises:

a first switch switching at least one of a reception line of the second port connector and an output side of the first transformer to be connected to a transmission line of the first port connector;

a second switch switching a signal received through a reception line of the first port connector to be transmitted to one of a transmission line of the second port connector and the first transformer;

a third switch switching between an output side of the second transformer and the transmission line of the second port connector; and a fourth switch switching between the reception line of the second port connector and an input side of the second transformer.

8. The gateway according to claim 7, wherein the first to fourth switches are each constructed to include a relay.

9. The gateway according to claim 8, further comprising a bypass controller generating a relay driving signal driving the relays.

10. The gateway according to claim 9, wherein the bypass controller comprises:

a bypass signal generator generating a bypass signal by monitoring power supply to the gateway; and a relay driver generating the relay driving signal by operating in response to the bypass signal.

11. The gateway according to claim 10, wherein:

the bypass signal generator receives a watchdog signal generated when the power supply is abnormal, a power supply signal generated when the power supply is interrupted, and a manual control signal enabling the bypass path to be formed according to a user selection, and the bypass signal generator generates the bypass signal when at least one of the watchdog signal, the power supply signal and the manual control signal is received.

12. A bypasser to be provided in a network gateway, the bypasser comprising:

switches in communication with port connectors of the gateway and in communication with port transformers of the gateway, the switches allowing communication between the port connector via the port transformers during normal gateway processing conditions and allowing communication between the port connectors via a bypass communication path other than the port transformers during abnormal gateway processing conditions; and a bypass controller controlling the switches responsive to the gateway communication conditions.

13. The bypasser according to claim 12, wherein the gateway processing conditions are input to the bypass controller and the conditions are at least one of an input watchdog signal generated when the gateway is in an abnormal state, an input power supply signal generated when power supplied to the gateway is interrupted, and an input manual control signal generated according to a user input.

14. The bypasser according to claim 12, wherein the bypass communication path is at least one physical communication path between two port connectors of the gateway.

15. A bypassing method in a network gateway, comprising:

allowing communication between port connectors of the gateway via port transformers during normal gateway processing conditions;

monitoring abnormal gateway processing conditions; and controlling, with a bypass controller, a formation of a bypass communication path between the port connectors responsive to the abnormal gateway processing conditions.

* * * * *